United States Patent
Phadke

(10) Patent No.: US 6,788,557 B2
(45) Date of Patent: Sep. 7, 2004

(54) SINGLE CONVERSION POWER CONVERTER WITH HOLD-UP TIME

(75) Inventor: Vijay Gangadhar Phadke, Pasig (PH)

(73) Assignee: Astec International Limited (HK)

( * ) Notice: Subject to any disclaimer, the term of this patent is extended or adjusted under 35 U.S.C. 154(b) by 0 days.

(21) Appl. No.: 10/364,846

(22) Filed: Feb. 10, 2003

(65) Prior Publication Data

US 2004/0156217 A1 Aug. 12, 2004

(51) Int. Cl.$^7$ .............................................. H02M 3/335
(52) U.S. Cl. .............................. 363/21.16; 363/21.08; 363/56.11; 307/103
(58) Field of Search ........................... 363/21.16, 21.08, 363/56.09, 131, 97, 56.11; 307/103

(56) References Cited

U.S. PATENT DOCUMENTS 4,236,198 A * 11/1980 Ohsawa et al. ............... 363/49
5,880,942 A * 3/1999 Leu ............................. 363/49
6,069,800 A   5/2000 Cross et al.

OTHER PUBLICATIONS

R. Watson, et al., "Characterization of an Active Clamp Flyback Topology for DC/DC Conversion and Power Factor Correction Applications", Applied Power Electronics Conference, Orlando, Florida, Feb. 13–17, 1994, pp. 412–418.

* cited by examiner

Primary Examiner—Shawn Riley
(74) Attorney, Agent, or Firm—Coudert Brothers LLP

(57) ABSTRACT

A power converter is provided that operates with a wide range input and provides the required hold up time using a smaller, less costly hold-up capacitor. A charging circuit is provided to charge a capacitor through an auxiliary winding. The power converter includes circuitry for channeling the energy from the capacitor to the converter to provide hold-up time during input power loss conditions, while having better utilization of stored energy. The power converter of the present invention also provides this function using fewer and lower cost components than prior art devices.

15 Claims, 4 Drawing Sheets

US 6,788,557 B2

SINGLE CONVERSION POWER CONVERTER WITH HOLD-UP TIME

FIELD OF INVENTION

The present invention relates to power converters, and more particularly, to a power converter that efficiently provides the required hold-up time during power line disturbance conditions.

BACKGROUND OF THE INVENTION

Many electronic devices require one or more regulated DC voltages. The power for such electronic devices is ordinarily supplied by a power converter that converts an input voltage into the regulated DC voltages required by the devices. Many types of power converters can operate over a wide input voltage range. If the input voltage falls below the minimum permissible voltage and adversely affects the converter operation, the electronic devices that rely on the converter for power could experience critical failures such as the loss of data. The length of time that the power converter can continue to operate in the absence of line voltage is referred to as the "hold-up" time. One known way that converters address this problem is to connect a bulk capacitor in parallel with the input power source. During normal operation, energy can be stored in the bulk capacitor to provide this hold-up time. The hold-up time depends upon the size of the bulk capacitor and the available duty cycle for the converter.

FIG. 1 shows a prior art AC-DC power converter 10 that includes a bulk capacitor for hold-up time. The power converter 10 includes an AC-to-DC boost converter 8 at the front end followed by a DC-to-DC converter 30 stage. A bridge rectifier 20 is arranged to convert an AC voltage applied at AC input terminals 14 and 16 to unregulated rectified DC pulses between terminals 15 and 13. This unregulated DC, which may be unsmoothed DC, is switched by a switch 12 through a boost inductor 24. The switch 12 is typically a MOSFET having a control signal input to its gate. The drive for the control signal input to switch 12 can be either a variable frequency or fixed frequency type, such that the input current is also sinusoidal with a minimum harmnonic distortion. Various integrated control circuits are known in the art for providing this drive (e.g., L4981, UC3854, and L6561). The boost converter 8 can operate as either a continuous current mode type or a discontinuous current mode type converter. Boost converter 8 develops a regulated DC bulk voltage across a bulk capacitor 18. The boost ratio provided by boost converter 8 is such that this DC bulk voltage is marginally higher than the highest peak of the input AC voltage. The DC bulk voltage is regulated by means of the boost converter 8. Converter 30 operates directly on this DC bulk voltage to provide the required isolation and secondary regulated voltage at DC output terminals 36 and 38.

Upon failure of the line input AC voltage, the energy stored in the bulk capacitor 18 will keep the DC to DC converter 30 in an operational state for a period of time, the hold-up time, following this interruption of input power. For converter 10, this hold-up time depends upon the size of the bulk capacitor 18 and the available duty cycle for the converter. Boost converter 8 typically has a wide regulation range due to the ability to operate at a nearly 100% duty cycle. The DC to DC converter 30 has limited operational duty cycle range and cannot operate over a very wide input voltage range. As a result, a larger bulk capacitor 18 is required to meet the hold-up time required to keep the DC output of the converter within acceptable limits.

Power converter 10 is presently commonly used and provides high performance characteristics. The supplied output voltage has line frequency ripple rejection. At low power levels, however, power converter 10 is expensive and has a high component count. Many low power applications exist which do not require fast transient response because of the nature of the load or the presence of fast post-regulators, at the outputs of converter 10. A need therefore exists for a lower cost, lower component solution for low power applications.

FIG. 2A shows a circuit diagram for a prior art AC-DC power converter 100. Power converter 100 comprises a power factor corrected flyback converter that switches directly on the rectified AC input pulses. AC input power is applied at terminals 114, 116 and is conventionally used to produce unsmoothed DC at terminals 113, 115 through the use of a conventional bridge rectifier 20. A capacitor 118 is connected in series with a diode 152 across the terminals 113, 115. Power converter 100 includes a transformer 128 having a primary winding 140, a secondary winding 142, and an auxiliary winding 144, each having a first and second end. In power converter 100, the auxiliary winding 144 provides the energy for recharging the capacitor 118 during each flyback cycle of the flyback converter 100.

Primary winding 140 is conventionally switched on and off at a predetermined frequency by a first switch 112. First switch 112 is typically a MOSFET having a control signal input at its control gate. The control signal input to switch 112 is typically a conventional pulse width modulation (PWM) or power factor correction (PFC) type drive signal (details not shown). Secondary winding 142 is connected to a rectifying and filter circuit comprising a diode 132 and a capacitor 134, to produce the rated DC output voltage at terminals 136 and 138.

The charging of capacitor 118 to a predetermined voltage is controlled by the circuit comprising auxiliary winding 144, a resistor 154 connected in series with a diode 126 between one end of auxiliary winding 144 and one terminal of capacitor 118, and a second switch 156 connected between the second end of auxiliary winding 144 and the other terminal of capacitor 118.

In operation, when switch 112 of converter 100 closes, current flows in the transformer primary 140 and energy is stored therein. When the first switch 112 is opened during the flyback period of converter 100, the polarity on the transformer 128 windings changes and rectifier diode 132 becomes forward biased. Diode 132 provides power to a load connected at DC output terminals 136, 138 and stores energy in output capacitor 134. During this flyback period when the first switch 112 is open, switch 156 is turned on and capacitor 118 is charged to a predetermined voltage determined by the turns ratio between primary winding 140 and auxiliary winding 144.

The voltage on capacitor 118 is usually selected low (around 50V or so). In normal operation, when the instantaneous voltage of the rectified AC pulse across terminals 115, 113 is higher than the voltage at which capacitor 118 is charged, diode 152 is reverse biased. Capacitor 118 will continue to hold its charge during this time. When this instantaneous voltage falls below the capacitor 118 voltage near the "valley point" of the rectified AC pulse, diode 152 becomes forward biased. As a result, capacitor 118 provides energy to transformer 128 to continue operation during this time. Capacitor 118 thus provides hold-up time during this period. Switch 156 can also be held off when the charge on capacitor 118 is being used by converter 100 in, order to reduce the peak currents in the transformer 128.

One drawback of the circuit in FIG. 2A is that capacitor 118 fails to provide the larger hold-up time required in most applications. Moreover, this also impacts the power factor since current is not drawn near the bottom of the rectified AC pulse. If capacitor 118 is to provide a large hold up time, then a huge capacitor will be needed, since the voltage charge on the capacitor 118 is very close to the voltage that exists at the bottom of the rectified pulse. As a result, there is poor energy utilization.

FIG. 2B shows a circuit diagram for another prior art flyback power converter that provides line harmonic correction. Power converter 110 comprises a fly back converter that switches directly on the rectified pulse and provides a DC output voltage with harmonic correction. The switch SW1 is driven by a typical power factor correction controller (not shown). In operation, the switching voltage at one end of the switch SW1 is rectified by D1 and charges capacitor C1 through resistor R1. Upon failure of the line input AC voltage, switch SW2 is closed and the voltage on C1 is applied at the input of the converter 110. The charge on C1 continues the operation of the converter during the missing AC input to provide the required hold up.

One of the drawbacks of the circuit in FIG. 2B is that, ignoring any spikes present due to leakage inductance of the transformer TRF1, the peak voltage at that junction of SW1 and the primary winding of transformer TRF1 is the sum of the peak input rectified voltage at the other end of the transformer primary winding, plus the reflected secondary voltage. This reflected voltage could be controlled by choosing a proper turns ratio of the transformer TRF1. The charge on the hold up capacitor C1 is therefore determined by the turns ratio of transformer TRF1 and the peak AC voltage. The type of converter shown in FIG. 2B is designed to operate over a wide input AC range, typically from 90V AC (RMS) to 265V AC (RMS). The range of the corresponding peak voltages for the sinusoidal waveform is 125V and 375V. Thus, although the reflected secondary voltage could be controlled by choosing proper turns ratio, the peak-rectified voltage varies widely. The extent of charge on C1 is thereby controlled by the input AC voltage. As a result, for converter 110, the value for capacitor C1 has to be chosen based on the lowest input voltage in order to provide the desired hold up time.

For converter 110 at the highest line input voltage of 265V AC, the voltage on capacitor C1 could be extremely high, typically higher than 500V. The converter 110 in FIG. 2B, thus has a drawback of requiring the use of a non-standard high voltage capacitor for capacitor C1 or a series combination of capacitors. Although in that case, capacitor C1 would provide a larger hold-up time, the hold-up time provided by the larger capacitance would be much more than required. A zener diode clamp could be inserted across C1 to limit the voltage, but undesirably higher power dissipation at high input AC condition could result. At a low line input voltage condition, a typical reflected voltage of 125V would charge capacitor C1 up to 250V. For converter 110, the value of capacitance required to provide the required hold up with 250V starting voltage may not be as small as expected.

Typical line dropout test requirements require that the power supply provide hold up for one missing cycle at the duty cycle of 10%. In other words, for this requirement there could be one missing cycle after each nine normal cycles. To satisfy this requirement, capacitor C1 in converter 110 must be charged back to the desired voltage during the duration of the nine normal AC cycles. Since the voltage on the transformer end of SW1 is line dependent, a fixed resistor R1 would give different charge times for capacitor C1 at different input line conditions. Thus, another drawback of power converter 110 is that, when the value of resistor R1 is chosen for the worst case low line condition, this resistor dissipates higher power for a high line condition.

A need therefore exists to provide the desired hold-up time during input power loss conditions while having better utilization of stored energy. There is also a need for a circuit that provides this function using fewer and lower cost components.

SUMMARY OF THE INVENTION

The present invention solves the problems of prior art devices by providing a power converter that efficiently provides the required hold-up time using a smaller, less costly hold-up capacitor. In the preferred embodiment, the present invention provides a flyback converter that switches directly on the input rectified AC pulses with variable pulse width/frequency such that harmonic correction is achieved. A capacitor is charged through a separate winding and is connected to the converter to provide the desired hold-up time only following an input voltage failure. The present invention is also suitable for any other type of AC to DC or DC to DC converter that operates over a wide input range and requires a hold-up time.

Consequently, the circuit and corresponding method of the present invention have the advantage of needing only lower cost components and fewer components as compared to prior art devices. Existing single conversion power factor corrected flyback converters do not provide the required hold-up time. Prior art single stage power factor correction techniques provide some hold-up time, but the variation in bulk capacitor voltage is wide depending on the input line voltage. As a result, a bigger bulk capacitor is required, which increases the cost and size of the power converter. Since the power converter of the present invention works with an inherent wide range input, a much smaller bulk capacitor is required in order to meet the hold-up requirements.

Broadly stated, the present invention provides a DC-DC converter having first and second input terminals to which an input DC voltage is coupled and two output terminals where the output DC power is provided, comprising a transformer comprising a primary winding, a secondary winding, and an auxiliary winding, each winding having a first and second end; the secondary winding coupled to the output terminals; a first switch connected in series with the primary winding across the first and second input terminals; the first switch alternately being switched on and off as a function of a control signal; a capacitor connected in series with a first diode and a second switch between the first and second input terminals; and a charging circuit for charging the capacitor to a predetermined value by the auxiliary winding; wherein the second switch is switched on when the input DC voltage is at or below a predetermined threshold such that the capacitor provides hold-up time for the converter.

BRIEF DESCRIPTION OF THE DRAWINGS

The forgoing aspects and the attendant advantages of the present invention will become more readily appreciated by reference to the following detailed description, when taken in conjunction with the accompanying drawings, wherein.

DETAILED DESCRIPTION OF THE INVENTION

The present invention comprises a power converter circuit and corresponding method which provides hold-up time so that the power converter can continue to operate in the absence of the required input line voltage. A capacitor is charged through a separate winding and controlled to provide energy to the converter only following the failure of the input voltage. The present invention operates with a wide range of input voltage and provides the required hold up time using a smaller and less costly hold-up capacitor compared to known converters.

Figure 1:
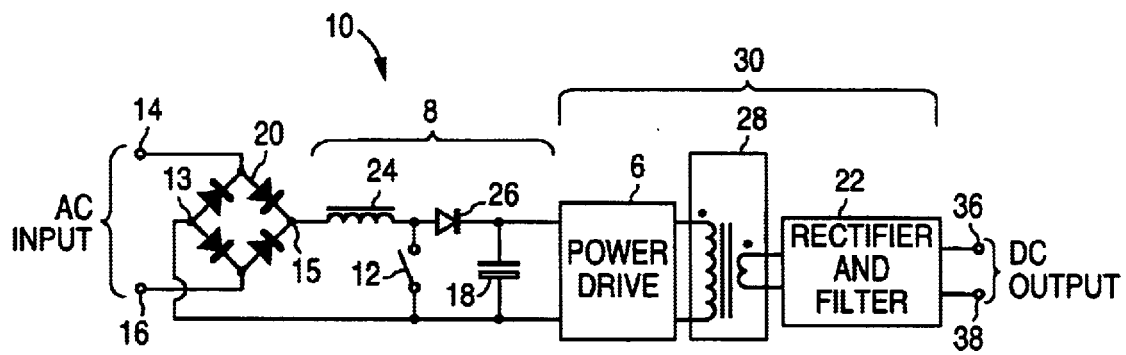
FIG. 1 shows a prior art power converter having an AC-DC boost converter at the front end followed by a DC-DC flyback converter stage.
Figure 2A:
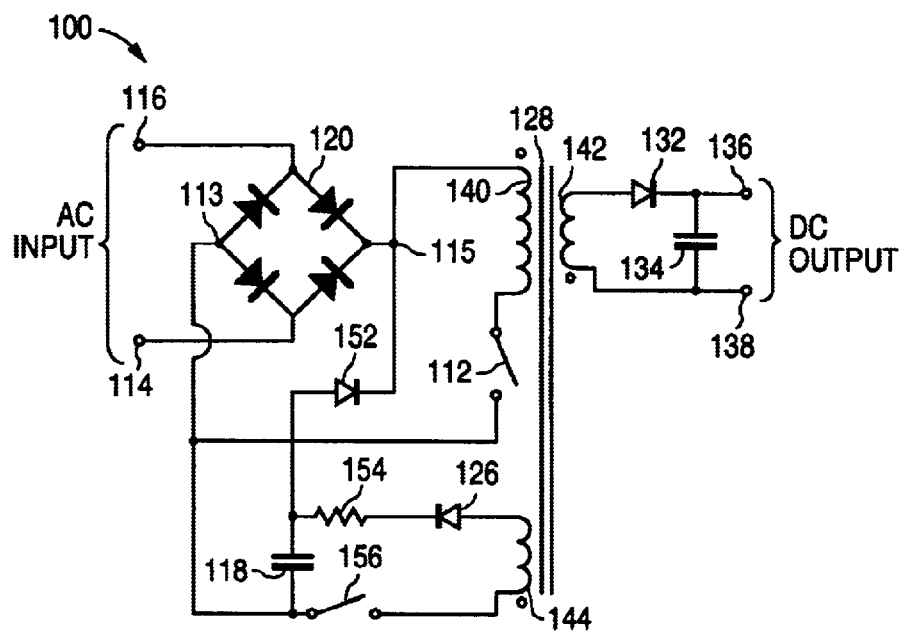
FIG. 2A depicts a prior art flyback power converter that provides line harmonic correction.
Figure 2B:
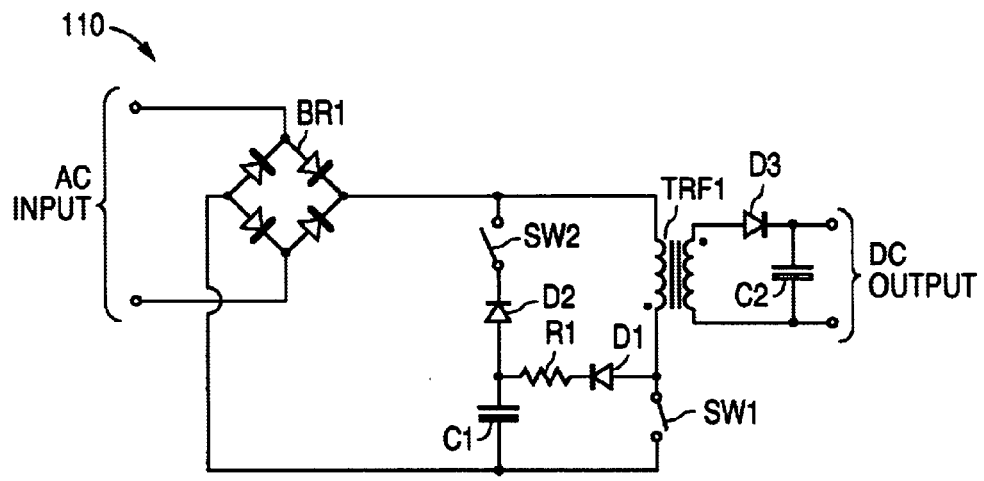
FIG. 2B shows another prior art flyback power converter that provides line harmonic correction.
Figure 3A:
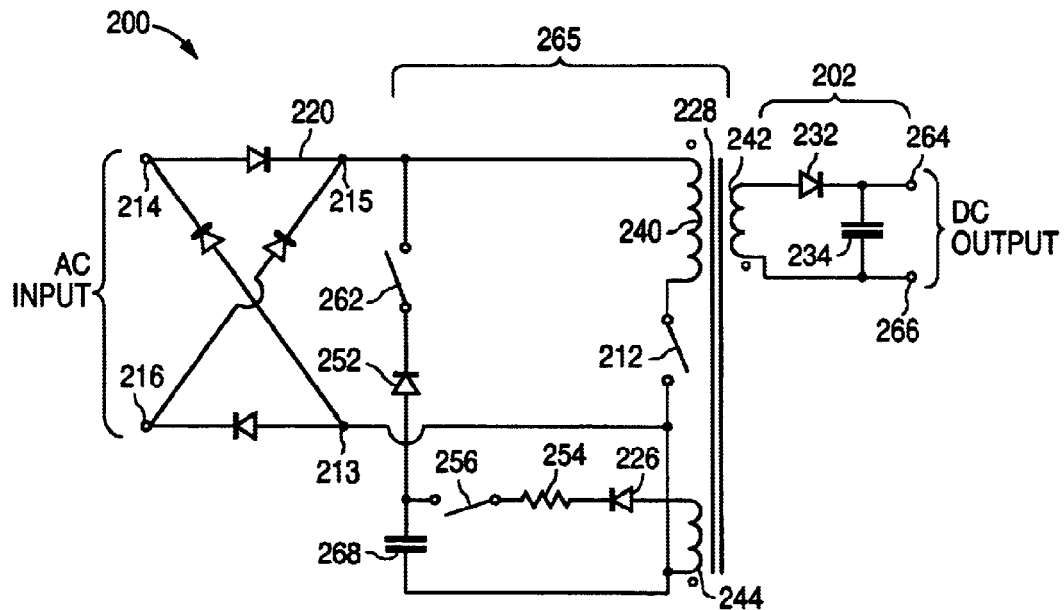
FIG. 3A shows the preferred embodiment of an AC-DC power converter according to the present invention.
Figure 3B:
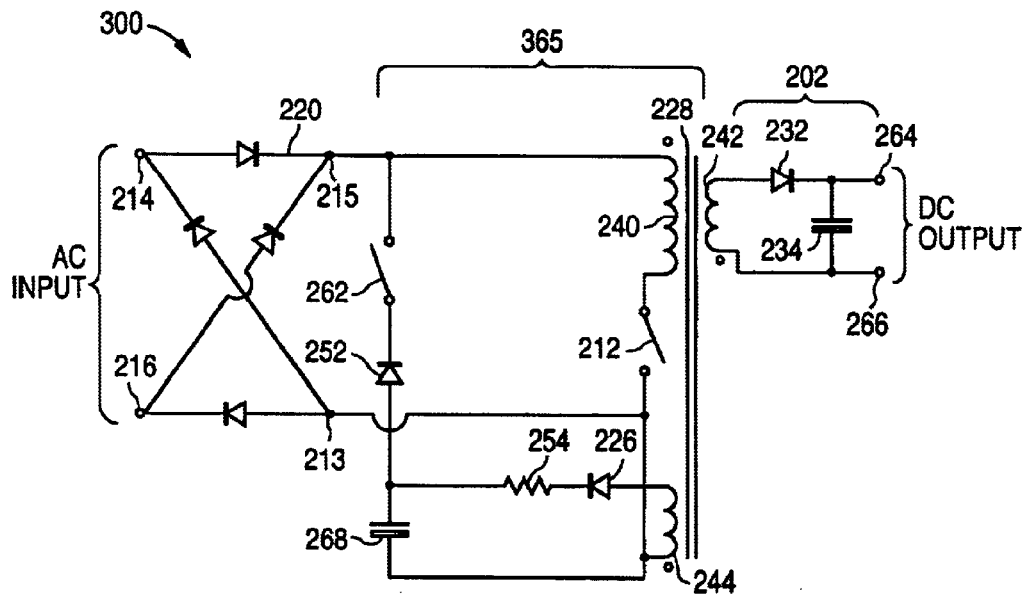
FIG. 3B shows an alternative embodiment of the AC-DC power converter of FIG. 3.

The present invention overcomes the drawbacks of the known circuits and methods. The present invention is illustrated with reference to FIGS. 3A–5. FIG. 3A shows the preferred embodiment of the power converter 200 according to the present invention. For AC-DC power converter 200, input AC is rectified by a rectifier 120, preferably a bridge rectifier, to generate unsmoothed DC between a positive terminal 215 and a negative terminal 213. A DC-DC converter according to the present invention is coupled between terminals 215, 213 and the DC output terminals 264, 266.

The DC-DC converter in AC-DC power converter 200 includes a transformer 228 having a primary winding 240, an auxiliary winding 244, and a secondary winding 242, each having a first and second end. The first switch 212 is connected in series between the second end of the primary winding 240 and the second end of auxiliary winding 244. The second end of auxiliary winding 244 is connected to the junction of terminal 213 and a first terminal of a bulk capacitor 268. A second switch 262 is connected in series with a second diode 252 between terminal 215 and the second terminal of capacitor 268. Capacitor 268 is charged to a predetermined voltage determined by the turns ratio between secondary winding 242 and auxiliary winding 244. The auxiliary winding 244 provides the energy for recharging the capacitor 268. The charging of capacitor 268 to a predetermined voltage is controlled by the circuit comprising auxiliary winding 244, a diode 226 connected in series with a resistor 254 and a third switch 256 between a first end of auxiliary winding 244 and the second terminal of capacitor 268. Upon failure of the line input AC voltage, the energy stored in the bulk capacitor 268 will keep the DC to DC converter 265 in an operational state for a period of time, the hold-up time.

A rectifying and filtering circuit 202 is coupled between secondary winding 242 and the DC output terminals 264, 266. In the preferred embodiment shown in FIG. 3A, the rectifying and filtering circuit 202 comprises a capacitor 234 connected across the DC output terminals 264, 266 and a third diode 232 connected between the first end of secondary winding 242 and the first output terminal 264. The third diode 232 preferably has an anode connected to the first end of secondary winding 242 and a cathode connected to the first DC output terminal 264.

The DC input voltage, which may be unsmoothed DC, is directly switched by the first switch 212 through the primary winding 240 of the transformer 228. The DC-DC power converter 265 according to the present invention preferably is a flyback converter that operates in either continuous current mode or a discontinuous current mode. Converter 265 can also be driven by a signal of fixed or variable frequency. The first switch 212 has a control signal input and is preferably a MOSFET. The signal coupled to the control signal input so as to drive first switch 212 may be a variable frequency or fixed frequency type such that the input current is also sinusoidal with minimum harmonic distortion. Any suitable known integrated control circuits may be used for providing this drive signal. For example, the drive signal coupled to first switch 212 may be controlled so as to provide power factor correction with a sinusoidal input current waveform with minimum harmonic distortion. Standard power factor correction integrated circuits may be used for this purpose (e.g., L4981, UC3856, and L6561.) Converter 265 can provide wide range line regulation since the drive pulses for first switch 212 are capable of reaching approximately a 95% duty cycle.

During normal operation, bulk capacitor 268 is charged to a predetermined value by auxiliary winding 244 through the series combination of first diode 226, resistor 254 and third switch 256. The auxiliary winding 244 is preferably a flyback winding such that a predictable, regulated voltage is obtained on bulk capacitor 268. In operation, when switch 212 of converter 200 closes, current flows in the transformer primary 240 and energy is stored therein. For a flyback converter embodiment, when the first switch 212 is opened during the flyback period of converter 200, the polarity on the transformer 228 windings changes and rectifier diode 232 becomes forward biased. Diode 232 provides power to a load connected at DC output terminals 264, 266 and stores energy in output capacitor 234.

Figure 6:
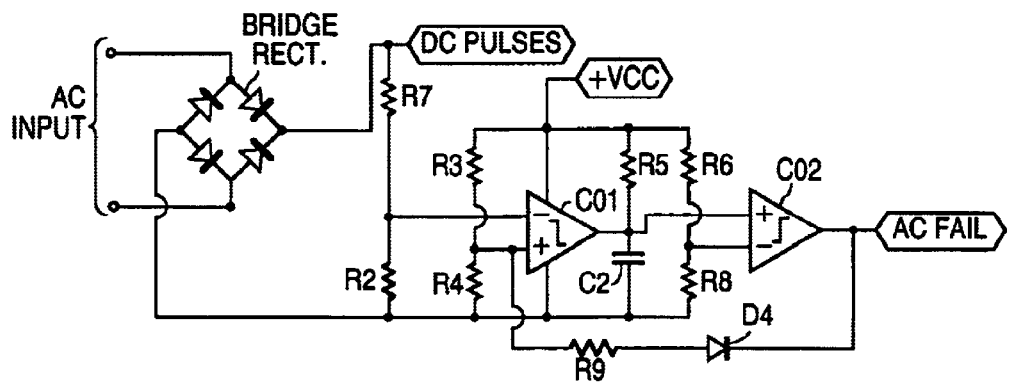
FIG. 6 shows a circuit diagram of an exemplary fast AC fail sensing circuit.

Operation during a failure of the input AC voltage will now be described. The falling of the input AC below a predetermined level is detected using a suitable fast sensing circuit known to one of ordinary skill in the art. FIG. 6 shows a circuit diagram of an exemplary fast AC fail sensing circuit. As seen in FIG. 6, a bridge rectifier is arranged to convert a sinusoidal AC voltage applied at the AC input terminals to a pulsating DC output identified as the "DC pulses" signal. This DC pulses signal is divided by a voltage divider formed by series resistors R7 and R2 to generate a sample of instantaneous voltage which is applied to the inverting input of a comparator C01. An internal auxiliary converter (not shown) generates a bias voltage VCC for the converter shown in FIG. 6. VCC is divided by a voltage divider formed by series resistors R3 and R4 to generate a reference voltage which is applied to the non inverting input of comparator C01. This reference voltage is set to a predetermined value such that the inverting input of comparator C01 is equal to this reference voltage whenever the instantaneous AC input voltage is approximately 15V. Thus, comparator C01 is connected such that the output is low for the condition wherein the instantaneous AC input voltage exceeds 15V.

The output of comparator C01 is applied to the non-inverting input of a comparator C02. VCC is divided by a voltage divider formed by series resistors R6 and R8 to generate a reference voltage which is applied to the inverting input of comparator C02. A resistor R5 is connected in series between VCC and the output of comparator C01. Capacitor C2 is connected in series with resistor R5, with the intersection point between the two elements being the output of comparator C01. In operation, if the AC input voltage does not reach the 15V level in one millisecond, the capacitor C2 charges up to the threshold of comparator C02 causing the output of comparator C02 (identified as the "AC fail" signal) to go high indicating an AC failure. Resistor R9 and diode D4 provide the necessary hysteresis for the two comparators. Thus, the exemplary fast sensing circuit shown in FIG. 6 provides for high speed detection of an AC failure. The present invention is not limited to use of the exemplary fast sensing circuit shown in FIG. 6, any suitable fast sensing circuit may be used.

Referring back to FIG. 3A, a suitable fast sensing circuit provides a control signal to close second switch 262 while opening third switch 256 at the same time. As a result, the voltage across the bulk capacitor 268 is applied at the input of the transformer 228. The flyback converter continues to switch on this input voltage source provided by bulk capacitor 268 until the voltage source collapses to a very low level. This operation is possible because of the wide operational duty cycle range of the converter. By way of example, typically a voltage level of 350V could be selected for the nominal voltage across bulk capacitor 268, thereby enabling use of a low cost 400V electrolytic capacitor. For this example, the power converter 200 operates till the voltage provided by bulk capacitor 268 falls to a level of about 50V or lower. As a result, for the embodiment of an AC-DC power converter according to the present invention shown in FIG. 3A, a small bulk capacitor 268 provides a long hold-up time due to better utilization of the stored energy.

The value of resistor 254 is chosen such that it does not draw a substantial amount of energy from the transformer 228 while charging and, at the same time, is designed to charge bulk capacitor 268 fully in less than nine AC line cycles. The requirement for resistor 254 for charging capacitor 268 is necessary in order for the power converter to meet the test of operating properly for a missing cycle at 10% duty cycle test condition.

According to the present invention as shown in FIG. 3A, switch 256 is opened during the missing cycle operation so that the energy drawn by the converter from the bulk capacitor 268 is not again used to charge capacitor 268. In an alternate embodiment of the AC-DC power converter shown in FIG. 3B, the third switch 256 is eliminated resulting in a less complicated circuit, although this would also result in the need for a slightly (typically 10%) higher value for the bulk capacitor 268. The second switch 262 and third switch 256 are preferably MOSFETs. The high side drive for these two switches can be generated using an opto-coupler (not shown).

Figure 4:
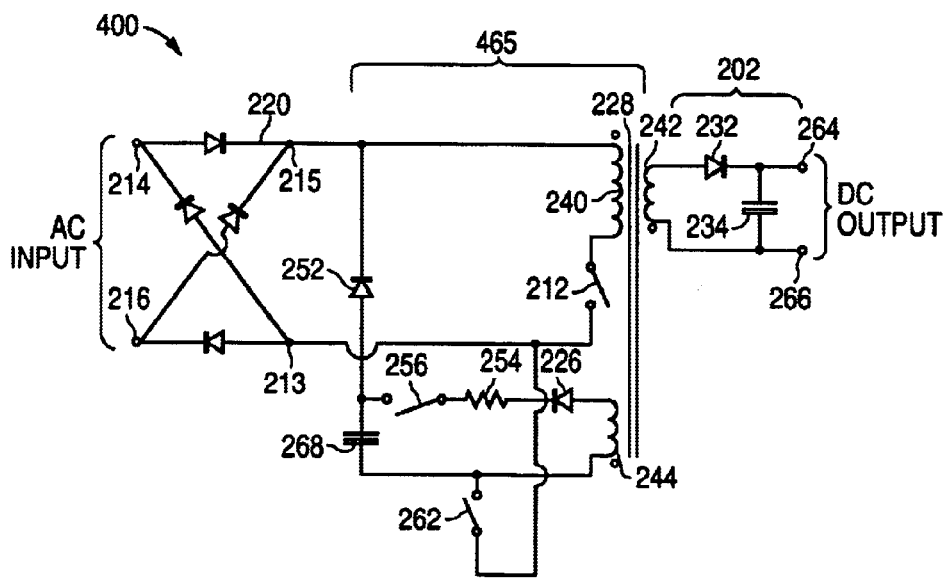
FIG. 4 shows another alternative embodiment of the AC-DC power converter of FIG. 3.

For the embodiment of the present invention shown in FIGS. 3A–4, the bulk capacitor 268 is not required to handle the stresses of ripple current during normal operation. As a result, a low cost capacitor can be selected for the bulk capacitor 268. The output DC voltage might exhibit a low frequency ripple, however, due to slow control loop that is designed to ignore twice line frequency ripple. The present invention is suitable for many applications, such as battery chargers, that can tolerate this low frequency ripple. As an alternative, a suitable post regulator can be used along with the present inventive circuit to provide better transient response and low frequency rejection if required.

FIG. 4 shows an alternative embodiment of the AC-DC power converter of FIG. 3 wherein the second switch 262 is located in an alternate position in the circuit. In this embodiment, a power converter 400 has second switch 262 connected in series between terminal 213 and a point at the intersection of capacitor 268 and the second end of the auxiliary winding 244.

The present invention also can be used for DC-DC power converters. Various DC to DC converters are designed to operate over a wide range on input voltage. For example, DC to DC converters used in telecommunication applications are typically designed to operate over a DC input range of 72V to 36V DC. When a particular application requires the hold-up time to continue operation of the converter even when input voltage falls below the level of 36V, it is very difficult to meet this requirement with a reasonably sized input hold-up capacitor for the known converters. The use of a reasonably sized capacitor will demand that the converter operate over a wider range of operation than normal, since the voltage on the capacitor will start collapsing down. As a result, for a reasonably sized capacitor, known converters may be required to operate with an input as low as 20V DC. Known converters will exhibit many undesirable side effects, such as high peak current, that result in lower efficiency, if forced to operate with such a wider range of input voltage.

Figure 5:
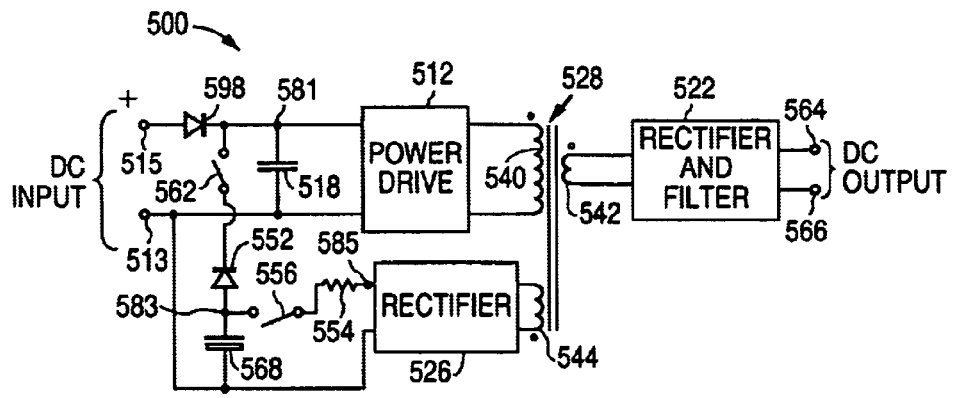
FIG. 5 shows an embodiment of a DC-DC power converter according to the present invention.

FIG. 5 shows an embodiment of a DC-DC power converter according to the present invention. Power converter 500 has DC input power applied at a positive terminal 515 and negative terminal 513 and produces a regulated DC output at terminals 564, 566. Power converter 500 includes a transformer 528 having a primary winding 540, a secondary winding 542, and an auxiliary winding 544, each having a first and second end. A power drive circuit 512 (details not shown) for controlling the primary winding 540 is connected in parallel between the primary winding 540 and the DC input terminals 515, 513. Power drive circuits for DC-DC converters are known to one of ordinary skill in the art. The power drive circuit 512 preferably comprises a switch having a control input at its gate and a circuit to provide the drive for the control signal input.

A first capacitor 518 is connected in parallel across the power drive circuit 512 between a first node 581 and the negative input terminal 513 to provide input filtering. A first diode 598 is connected in series between the positive DC input terminal 515 and a first node 581. Power converter 500 also includes a first switch 562 connected in series with a second diode 552 and a second (bulk) capacitor 568 between the first node 581 and the negative input terminal 513. The bulk capacitor 568 and second diode 552 are coupled at node 583. A second switch 556 is connected in series with a resistor 554 between a third node 585 and the second node 583. The first and second switches are preferably MOSFETs, each having a control signal input to its gate. A rectifier 526 is connected in parallel between the auxiliary winding 544 and the third node 585 and negative input terminal 513. A known rectifying and filtering circuit 522 (details not shown) is coupled between the secondary winding 542 and the DC output terminals 564, 566 to provide smoothing and filtering of the DC voltage from transformer 528.

Bulk capacitor 568 is charged to the predetermined value by a circuit comprising the auxiliary winding 544, rectifier 526, and resistor 554, and second switch 556. For operation of the power converter 500, for example, the bulk capacitor 568 can be charged up to 72V DC. The sensing circuit/controller (not shown) detects the condition where the input voltage falls below a predetermined threshold that is determined by the permissible range of input of the converter. For power converter 500, for example, the threshold level could be set to 36V DC. In response to the detection of the DC input power loss at the input terminals 515, 513, the circuit sets the first switch 562 on and the second switch 556 off simultaneously. As a result, upon failure of the line input AC voltage, the energy stored in the bulk capacitor 568 will keep the DC to DC converter 500 in an operational state for a period of time, the hold-up time, following this interruption of input power. During this hold-up time, power converter 500 continues to operate until the voltage on bulk capacitor 568 falls to the 36V DC level. The present invention thus has the advantage of providing hold up time for a DC to DC converter without unduly stressing the converter.

Consequently, the present invention has the advantage of providing the required hold-up time while using fewer and lower cost components as compared to known converters. The present invention operates with an inherent wide range input, and requires a single, much smaller bulk capacitor to meet hold-up requirements.

The foregoing detailed description of the invention has been provided for the purposes of illustration and description. Although exemplary embodiments of the present invention have been described in detail herein with reference to the accompanying drawings, it is to be understood that the invention is not limited to the precise embodiments disclosed, and that various changes and modifications to the present invention are possible in light of the above teaching.

What is claimed is:

1. A DC-DC converter having first and second input terminals to which an input DC voltage is coupled and two output terminals where the output DC power is provided, comprising:
    a transformer comprising a primary winding, a secondary winding, and an auxiliary winding, each winding having a first and second end; said secondary winding coupled to said output terminals;
    a first switch connected in series with said primary winding across said first and second input terminals; said first switch alternately being switched on and off as a function of a control signal;
    a capacitor connected in series with a first diode and a second switch between said first and second input terminals; and
    a charging circuit for charging said capacitor to a predetermined value by said auxiliary winding;
    wherein said second switch is switched on when said input DC voltage is at or below a predetermined threshold such that said capacitor provides hold-up time for said converter.

2. The converter of claim 1, wherein the input DC voltage is an unregulated voltage generated by a rectifier fed from a source of AC power.

3. The converter of claim 1, wherein said charging circuit comprises a second diode connected in series with a resistor between said first end of said auxiliary winding and a first terminal of said capacitor at the junction of said capacitor and said first diode; and wherein said second end of said auxiliary winding is connected to the other terminal of said capacitor.

4. The converter of claim 1, said charging circuit further comprising a third switch connected in series between said resistor and said first terminal of said capacitor; wherein said third switch is switched off when said second switch is switched on, such that said capacitor is not being charged by said charging circuit when said capacitor is providing hold-up time for said converter.

5. The converter of claim 1, wherein said first diode has an anode and cathode, said second switch is connected in series between said first input terminal and said cathode of said first diode, said anode of said first diode being connected to a first terminal of said capacitor and the other terminal of said capacitor being connected to said second end of said auxiliary winding.

6. The converter of claim 1, wherein said second switch is connected in series between said second input terminal and a second terminal of said capacitor.

7. The converter of claim 5, wherein said first diode has an anode connected to the first terminal of said capacitor and a cathode connected to said first input terminal, said other terminal of said capacitor being connected to said second end of said auxiliary winding.

8. The converter of claim 1, further comprising a rectifying and filtering circuit coupled between said secondary winding and said two output terminals.

9. The converter of claim 1, wherein said first and second switches are MOSFETs.

10. The converter of claim 1, wherein the state of said first switch is controlled to provide power factor correction.

11. The converter of claim 1, wherein the state of said first switch is controlled by a pulse width modulated signal.

12. The converter of claim 1, wherein said converter is a flyback converter.

13. An AC to DC power converter with single stage DC to DC conversion having two AC input terminals to which a source of AC power is coupled and two output terminals where the output DC power is provided, comprising:
    a bridge rectifier connected to said AC input terminals for generating a rectified AC input voltage from said source of AC power;
    a DC-DC converter having first and second input terminals to which said rectified AC voltage is coupled and whose output is coupled to said two output terminals where the output DC power is provided, comprising:
        a transformer comprising a primary winding, a secondary winding, and an auxiliary winding, each winding having a first and second end; said secondary winding being coupled to said output terminals;
        a first switch connected in series with said primary winding across said first and second input terminals; said first switch alternately being switched on and off as a function of a control signal;
        a capacitor connected in series with a first diode and a second switch between said first and second input terminals; and
        a charging circuit for charging said capacitor to a predetermined value by said auxiliary winding;
        wherein said second switch is switched on when said input DC voltage is at or below a predetermined threshold such that said capacitor provides hold-up time for said converter.

14. A DC-DC converter having first and second input terminals to which an input DC voltage is coupled and two output terminals where the output DC power is provided, comprising:
    a transformer comprising a primary winding, a secondary winding, and an auxiliary winding, each winding having a first and second end;
    a rectifier and filter circuit connected in parallel between said secondary winding and said two output terminals;

a first diode connected in series between said first input terminal and a first node;

a power drive circuit having a first and second output connected across said primary winding and a first input connected to said first node and a second input connected to said second input terminal;

a first capacitor connected in series with a first diode and a second switch between said first node and said second input terminal; said first capacitor and first diode being connected at a second node;

a second capacitor connected in parallel between said first node and said second input terminal; and a charging circuit for charging said first capacitor to a predetermined value by said auxiliary winding;

wherein said second switch is switched on when said input DC voltage is at or below a predetermined threshold such that said first capacitor provides hold-up time for said converter.

15. A method of providing hold-up time in a DC-DC power converter, said DC-DC converter having first and second input terminals to which an input DC voltage is coupled and two output terminals where the output DC power is provided, and having a transformer having a primary, a second, and an auxiliary winding, a first switch connected in series with said primary winding across said first and second input terminals, a capacitor connected in series with a first diode and a second switch between said first and second input terminals; and a charging circuit for charging said capacitor to a predetermined value by said auxiliary winding; said method comprising the steps of:

a) switching said first switch on and off as a function of a control signal;

b) monitoring the voltage level of said input DC voltage;

c) charging said first capacitor to a predetermined value by said auxiliary winding through said charging circuit;

d) switching said second switch to an on state when the voltage level of said input DC voltage is at or below a predetermined threshold; and e) providing hold-up time for said converter by said capacitor when said second switch in an on state.

* * * * *